US010375976B2

(12) United States Patent
Baier et al.

(10) Patent No.: US 10,375,976 B2
(45) Date of Patent: Aug. 13, 2019

(54) FLAVOR-ENHANCED BEVERAGE PRODUCT AND METHOD OF ENHANCING THE FLAVOR THEREOF

(71) Applicant: Frito-Lay North America, Inc., Plano, TX (US)

(72) Inventors: Stefan K. Baier, Hartsdale, NY (US); Peta-Gaye Chambers, Hawthorne, NY (US); Winsome Johnson, Ossining, NY (US); Rajesh Venkata Potineni, Union, NJ (US)

(73) Assignee: Frito-Lay North America, Inc., Plano, TX (US)

( * ) Notice: Subject to any disclaimer, the term of this patent is extended or adjusted under 35 U.S.C. 154(b) by 361 days.

(21) Appl. No.: 15/088,575

(22) Filed: Apr. 1, 2016

(65) Prior Publication Data

US 2017/0280751 A1 Oct. 5, 2017

(51) Int. Cl.

| | |
|---|---|
| ***A23L 2/56*** | (2006.01) |
| ***A23F 5/46*** | (2006.01) |
| ***A23L 2/385*** | (2006.01) |
| ***A23L 2/40*** | (2006.01) |
| ***A23L 2/02*** | (2006.01) |
| ***A23L 2/60*** | (2006.01) |
| ***A23F 3/40*** | (2006.01) |
| ***C12G 3/06*** | (2006.01) |

(52) U.S. Cl.

CPC *A23L 2/56* (2013.01); *A23F 3/40* (2013.01); *A23F 5/465* (2013.01); *A23L 2/02* (2013.01); *A23L 2/385* (2013.01); *A23L 2/40* (2013.01); *A23L 2/60* (2013.01); *C12G 3/06* (2013.01)

(58) Field of Classification Search

CPC ... A23L 2/02; A23L 2/56; A23L 2/385; A23L 27/21; A23L 27/22

See application file for complete search history.

(56) References Cited

U.S. PATENT DOCUMENTS

| | | | |
|---|---|---|---|
| 5,366,747 A | 11/1994 | Buckholz, Jr. et al. | |
| 5,882,706 A * | 3/1999 | Kawashima | A23L 2/66 426/271 |
| 2002/0187240 A1 | 12/2002 | Young et al. | |
| 2004/0029955 A1 * | 2/2004 | Kouge | A61K 31/198 514/459 |
| 2004/0106826 A1 | 6/2004 | Kochat et al. | |
| 2004/0202760 A1 | 10/2004 | Dewis et al. | |
| 2004/0234457 A1 | 11/2004 | Rennie | |
| 2013/0084378 A1 | 4/2013 | Jun et al. | |
| 2014/0205729 A1 | 7/2014 | Didzbalis | |
| 2014/0287097 A1 | 9/2014 | Batenburg et al. | |
| 2015/0056338 A1 | 2/2015 | Chigurupati | |
| 2015/0079012 A1 | 3/2015 | Bellas et al. | |
| 2015/0080469 A1 | 3/2015 | Kogiso et al. | |
| 2015/0197416 A1 | 7/2015 | Hoover | |
| 2015/0342231 A1 | 12/2015 | Didzbalis et al. | |
| 2016/0015063 A1 | 1/2016 | Didzbalis et al. | |
| 2016/0135489 A1 | 5/2016 | Batenburg et al. | |

FOREIGN PATENT DOCUMENTS

| | | |
|---|---|---|
| AU | 2008229662 A1 | 4/2009 |
| JP | 2012029616 A | 2/2012 |
| WO | 2003043444 A1 | 5/2003 |
| WO | 2014116750 A2 | 7/2014 |
| WO | 2015050535 A1 | 4/2015 |

OTHER PUBLICATIONS

PCT International Search Report and Written Opinion for PCT/US17/24820 dated Jun. 28, 2017 (8 pages).

Gillette, "Flavor Effects of Sodium Chloride" Food Technology, Jun. 1985, pp. 47-56 (7 pages).

Oruna-Concha et al., "Comparison of Volatile Compounds Isolated from the Skin and Flesh of Four Potato Cultivars after Baking" J. Agric. Food Chem. 2001, 49, 2414-2421 (8 pages).

Oruna-Concha et al., "Comparison of the Volatile Components of Eight Cultivars of Potato after Microwave Baking" Lebensm.-Wiss. u.-Technol., 35, 80-86 (2002) (7 pages).

Majcher et al., "Identification of Potent Odorants Formed during the Preparation of Extruded Potato Snacks" J. Agric. Food Chem. 2005, 53, 6432, 6437 (6 pages).

Morris et al., "Umami Compounds Are a Determinant of the Flavor of Potato (*Solanum tuberosum* I.)" J. Agric. Food Chem. 2007, 55, 9627-9633 (7 pages).

(Continued)

*Primary Examiner* — Nikki H. Dees

(74) *Attorney, Agent, or Firm* — Sterne, Kessler, Goldstein & Fox P.L.L.C.

(57) ABSTRACT

A flavor-enhanced beverage includes an added amount of pyroglutamic acid or a salt thereof. The pyroglutamic acid may be in the form of L-pyroglutamic acid, D-pyroglutamic acid, monosodium L-pyroglutamate, monosodium D-pyroglutamate, or a mixture thereof. Both ready-to-drink beverages (such as fruit juices, vegetable juices, coffee, tea, carbonated soft drinks, energy drinks, sports drinks, dairy, and low calorie drinks) as well as concentrated beverages used for the preparation of ready-to-drink beverages benefit from the addition of the pyroglutamic acid. The addition to a beverage product may be in an amount of up to about 3,000 ppm of pyroglutamic acid or a salt thereof, in concentrates, or up to about 300 ppm in ready-to-drink beverages.

13 Claims, No Drawings

(56) References Cited

OTHER PUBLICATIONS

Dermiki et al., "Maximising umami taste in meat using natural ingredients: effects on chemistry, sensory perception and hedonic liking in young and old consumers" J. Sci. Food Agric. 2013, 93:3312-3321 (10 pages).
Hofmann et al., "Challenges in Taste Research : Present Knowledge and Future Implications" 2004 American Chemical Society (24 pages).
Festring et al., "Stereoselective Synthesis of Amides Sharing the Guanosine 5'-Monophosphate Scaffold and Umami Enhancement Studies Using Human Sensory and hT1R1/rT1R3 Receptor Assays" J. Agric. Food Chem. 2001, 59, 8875-8885 (11 pages).
Lioe et al., "Umami Taste Enhancement of MSG/MaCl Mixtures by Subthreshold L-x-Aromatic Amino Acids" Journal of Food Science, vol. 70, Nr. 7, 2005, S401-S405 (5 pages).
Oka et al., "Isolation and Characterization of Neutral Peptides in Soy Sauce" Agr. Biol. Chem. 38 (6), 1185-1194, 1974 (10 pages).
Shiga et al., "Metabolic Profiling Approach to Explore Compounds Related to the Umami Intensity of Soy Sauce" J. Agric. Food Chem. 2014, 62, 7317-7322 (6 pages).
Suess et al., "Human Taste and Umami Receptor Responses to Chemosensorica Generated by Maillard-type N2-Alkyl- and N2-Arylthiomethylation of Guanosine 5'-Monophosphates" J. Agric. Food Chem. 2014, 62, 11429-11440 (12 pages).
Kaneko et al., "Molecular and Sensory Studies on the Umami Taste of Japanese Green Tea" J. Agric. Food Chem. 2006, 54, 2688-2694 (7 pages).
Giovanni et al., "Time Intensity Profiles of Flavor Potentiators (MSG, IMP, GMP)" Journal of Sensor Studies 16 (2001) 407-423 (17 pages).
Kawas et al. "Characterization of product quality attributes of tortilla chips during the frying process" Journal of Dood Engineering, 47 (2001) 97-107 (11 pages.

* cited by examiner

FLAVOR-ENHANCED BEVERAGE PRODUCT AND METHOD OF ENHANCING THE FLAVOR THEREOF

BACKGROUND OF THE INVENTION

Technical Field

The present invention relates to beverages having an enhanced flavor. In particular, the present invention relates to addition of a pyroglutamic acid composition in a beverage product, which may include a ready-to-drink liquid as well as a syrup or concentrate for the creation of a ready-to-drink liquid.

Description of Related Art

The flavor of beverages is continuously modified to deliver new and desirable tastes to consumers. There is a need for beverages with enhanced flavor and a corresponding need for methods of obtaining such beverages.

SUMMARY OF THE INVENTION

Provided herein is a method for improving upon beverage products to provide for beverage products having an enhanced flavor, including, for example, better mouthfeel and/or creamier taste. More specifically, a beverage product comprises an added, that is exogenous, amount of pyroglutamic acid or a salt form thereof. Further description of the enhanced flavor will become apparent in the below written detailed description.

In some embodiments of the above beverage product, the beverage product is a ready-to-drink liquid formulation or beverage, wherein the added amount of pyroglutamic acid or salt thereof is up to about 300 ppm by weight of the total beverage product composition. In some of such ready-to-drink beverage embodiments, the added amount of pyroglutamic acid or salt thereof is up to about 200 ppm by weight of the total beverage product composition. In other such ready-to-drink beverage embodiments, the added amount of pyroglutamic acid or salt thereof is between about 15 ppm to about 150 ppm by weight of the total beverage product composition.

The beverage product comprising an added amount of pyroglutamic acid or salt thereof is a beverage concentrate or syrup in other embodiments. Such concentrates or syrups may be used to produce a ready-to-drink liquid formulation. In any embodiment wherein the beverage product is a beverage concentrate or syrup, the added amount of pyroglutamic acid is an amount sufficient to achieve an enhanced ready-to-drink beverage comprising up to about 300 ppm added pyroglutamic acid. In any embodiment wherein the beverage product is a beverage concentrate or syrup, the added amount of pyroglutamic acid is up to about 3,000 ppm by weight of the total beverage product composition.

In any of the above embodiments, the pyroglutamic acid or salt thereof is in the form of L-pyroglutamic acid, D-pyroglutamic acid, monosodium L-pyroglutamate, monosodium D-pyroglutamate, or a mixture thereof. In any of the above embodiments, the added pyroglutamic acid consists of L-pyroglutamic acid. In any of the above embodiments, the added pyroglutamic acid consists of D-pyroglutamic acid. In any of the above embodiments, the added pyroglutamic acid consists of L-pyroglutamic acid and D-pyroglutamic acid. In any of the above embodiments, the added pyroglutamic acid comprises L-pyroglutamic acid and D-pyroglutamic acid in a ratio ranging from about 50:50 to about 100:0. Embodiments within the ratio ranging from about 50:50 to about 100:0 may further comprise dairy.

Any of the above beverage product embodiments may further comprise an added flavor. Any of the above beverage product embodiments further comprise a sweetener, water, dairy, caffeine, carbonation, fruit juice, vegetable juice, food grade acid, or a mixture thereof.

A method of enhancing a beverage product comprises the adding of a pyroglutamic acid or a salt thereof into the beverage product, wherein said addition provides for an enhanced flavor. In some embodiments of the method, the beverage product is a ready-to-drink beverage comprising the pyroglutamic acid or salt thereof in an amount of up to about 300 ppm by weight of the total beverage product composition. In other embodiments of the method, the beverage product is a beverage concentrate suitable for the formation of a ready-to-drink beverage comprising the pyroglutamic acid or salt thereof in an amount of up to about 300 ppm by weight of the total beverage product composition. Where the beverage product is a beverage concentrate, the method further comprises the step of diluting the beverage concentrate to prepare a ready-to-drink beverage.

In any of the above embodiments of the method, the pyroglutamic acid is in the form of L-pyroglutamic acid, D-pyroglutamic acid, monosodium L-pyroglutamate, monosodium D-pyroglutamate, or a mixture thereof. In any of the above embodiments of the method, the pyroglutamic acid consists of L-pyroglutamic acid. In any of the above embodiments of the method, the pyroglutamic acid consists of D-pyroglutamic acid. In any of the above embodiments of the method, the pyroglutamic acid consists of L-pyroglutamic acid and D-pyroglutamic acid. In any of the above embodiments of the method, the pyroglutamic acid comprises L-pyroglutamic acid and D-pyroglutamic acid in a ratio ranging from about 50:50 to about 100:0. In any of the above embodiments of the method, the method further comprises a step of adding the pyroglutamic acid to a flavor.

Other aspects, embodiments and features of the invention will become apparent in the following written detailed description.

DETAILED DESCRIPTION OF THE INVENTION

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase. To the extent that a term or phrase is intended to have a special meaning, i.e., a meaning other than that understood by skilled artisans, such a special definition is expressly set forth in the specification in a definitional manner that directly and unequivocally provides the special definition for the term or phrase.

The terms “including,” “comprising,” “having,” and variations thereof mean “including but not limited to,” unless expressly specified otherwise. When used in the appended claims, in original and amended form, the term “comprising” is intended to be inclusive or open-ended and does not exclude any additional, unrecited element, method, step or material. The term “consisting of” excludes any element, step or material other than those specified together with the phrase. Several embodiments for the flavor enhanced beverage and methods for making same will now be described.

The terms "beverage concentrate," "concentrate," and "syrup" are used interchangeably throughout this disclosure and refer to a composition suitable for use in the preparation of ready-to-drink liquid formulation embodiments. Exemplary embodiments are described elsewhere in this disclosure.

The term "sweetness recognition threshold concentration," as generally used herein, is the lowest known concentration of a given sweetener or combination of sweeteners that is perceivable by the human sense of taste, typically around about 1.5% sucrose equivalence.

As used herein, "taste" refers to a combination of sweetness perception, temporal effects of sweetness perception, i.e., on-set and duration, off-tastes, e.g. bitterness and metallic taste, residual perception (aftertaste), and tactile perception, e.g. body and thickness.

The term "nutritive sweetener" refers generally to sweeteners which provide significant caloric content in typical usage amounts, e.g., more than about 5 calories per 8 oz. serving of a beverage.

As used herein, the term "non-nutritive sweetener" refers to all sweeteners other than nutritive sweeteners.

As used herein, the phrase "weight percent" refers to a weight percent calculated based on the total weight of a given composition or formulation.

It should be understood that, where context allows, the term "amount" is used interchangeably with "concentration." As used here, these terms should be understood to mean the amount of the component in question by weight of the total beverage product composition or final beverage formulation, unless otherwise stated. The unit "ppm" refers to parts per million by volume of the total beverage product composition. One ppm is equivalent to 1 mg per liter of solution (mg/L). "By weight of the total beverage product composition" refers to the weight of the compound (for example, the pyroglutamic acid as described herein) to the volume of beverage product composition.

Generally, the disclosure relates to a beverage product comprising an added amount of a pyroglutamic acid, and/or a salt form thereof. As used herein, pyroglutamic acid (PGA) refers to any enantiomer of pyroglutamic acid (i.e., L-pyroglutamic acid (L-PGA) and D-pyroglutamic acid (D-PGA)), any salt form of pyroglutamic acid (e.g., an alkaline salt such as monosodium L-pyroglutamate (L-MSpG) and monosodium D-pyroglutamate (D-MSpG)), and any combination of these forms of pyroglutamic acid. In one embodiment, the pyroglutamic acid comprises one or more of monosodium L-pyroglutamate (L-MSpG) and monosodium D-pyroglutamate (D-MSpG). The pyroglutamic acid may also be present in the form of L-pyroglutamic acid and D-pyroglutamic acid, and any mixture of L-pyroglutamic acid and D-pyroglutamic acid in another embodiment. Furthermore, a "salt form thereof" (or a "salt form of a pyroglutamic acid") is a food-grade salt acceptable or suitable for ingestion or consumption, for example a sodium salt, a potassium salt, a calcium salt, a zinc salt, a magnesium salt, an ammonium salt, an alkyl ammonium salt and the like.

Suitable pyroglutamic acid is readily available, extracted, derived, or synthesized from any number of sources or manufacturers.

The beverage products disclosed here include ready-to-drink liquid formulations (i.e., ready-to-drink beverages), beverage concentrates, beverage pods, and the like. The term "ready-to-drink" refers to a beverage formulated to be ingested as-is. Thus, in some embodiment, the ready-to-drink beverage requires no dilution or additions prior to ingestion by a consumer. Certain embodiments of the beverage products disclosed here are concentrates or syrups for producing ready-to-drink liquid formulations, that is, concentrates to be diluted with carbonated or un-carbonated (i.e., still) water to produce ready-to-drink beverages, e.g., syrups to be diluted with carbonated water to produce ready-to-drink carbonated soft drinks.

The beverage products include, for example, juice beverages (e.g., beverages comprising one or more fruit juices and/or one or more vegetable juices), hydration beverages such as those with added electrolytes, sports drinks, flavored waters, frozen or chilled beverages, caffeinated beverages, carbonated beverages, non-carbonated beverages, and zero to low calorie drinks (for example, 0-150 kcals and up to 10 grams sugar/12 oz.), such as diet or other reduced calorie beverages. In certain embodiments, the beverage product can be any of carbonated and non-carbonated soft drinks, fountain beverages, refrigerated ready-to-drink beverages, coffee, tea, and other brewed beverages, dairy beverages, enhanced waters, fruit juice such as orange juice (including diluted and ready to drink concentrated juices), fruit juice-flavored drinks, smoothies, functionally enhanced beverages such as caffeinated energy drinks, and alcoholic products. In particular embodiments, the beverage can be a cola beverage.

In some embodiments, the beverage product is a syrup or concentrate suitable for dilution, for example, by a 1-plus-5 throw with carbonated or un-carbonated water to produce a ready-to-drink liquid formulation.

In some embodiments, the concentration of pyroglutamic acid in the beverage products described herein is calculated based on the weight of the free acid form (i.e., the weight of all salt forms, if present, is converted to the corresponding weight of the free acid for the calculation). In various embodiments, the beverage product as described herein can include added pyroglutamic acid (e.g., in any form as described herein) in an amount of up to about 3,000 ppm by weight of the total beverage product composition (e.g., about 5 ppm, about 25 ppm, about 50 ppm, about 75 ppm, about 100 ppm, about 125 ppm, about 150 ppm, about 175 ppm, about 200 ppm, about 225 ppm, about 250 ppm, about 275 ppm, about 300 ppm, about 325 ppm, about 350 ppm, about 375 ppm, about 400 ppm, about 425 ppm, about 450 ppm, about 475 ppm, about 500 ppm, about 525 ppm, about 550 ppm, about 575 ppm, about 600 ppm, about 625 ppm, about 650 ppm, about 675 ppm, about 700 ppm, about 725 ppm, about 750 ppm, about 775 ppm, about 800 ppm, about 825 ppm, about 850 ppm, about 875 ppm, about 900 ppm, about 925 ppm, about 950 ppm, about 975 ppm, about 1,000 ppm, about 1,200 ppm, about 1,500 ppm, about 1, 750 ppm, about 2,000 ppm, about 2,100 ppm, about 2,250 ppm, about 2, 500 ppm, about 2,750 ppm, about 3,000, or any ranges between these recited concentrations). As discussed herein, the optimal concentration of pyroglutamic acid may vary according to different types of beverage products and the desired effects. A skilled person can adjust the concentrations of pyroglutamic acid for a given beverage product to achieve a certain effect based on the disclosure herein.

In any of the embodiments described herein, the pyroglutamic acid can be a mixture of L-pyroglutamic acid (and/or a salt thereof, e.g., monosodium salt) and D-pyroglytamic acid (and/or a salt thereof, e.g., monosodium salt) in a ratio ranging from 0:100 (i.e., no pyroglutamic acid or salts thereof in the L-form) to 100:0 (i.e., no pyroglutamic acid or salts thereof in the D-form) (e.g., about 0:100, about 5:95, about 10:90, about 15:85, about 20:80, about 25:75, about 30:70, about 35:65, about 40:60, about 45:55, about 1:1, about 55:45, about 60:40, about 65:35, about 70:30, about 75:25, about 80:20, about 85:15, about 90:10, about 95:5, about 100:0, or any ranges between the recited ratios). In some embodiments, the ratio of L-pyroglutamic acid (and/or a salt thereof, e.g., monosodium salt) and D-pyroglutamic acid (and/or a salt thereof, e.g., monosodium salt) is about 1:1. In some embodiments, the ratio of L-pyroglutamic acid (and/or a salt thereof, e.g., monosodium salt) and D-pyroglutamic acid (and/or a salt thereof, e.g., monosodium salt) is about 50:50 to about 100:0. In some embodiments, the ratio of L-pyroglutamic acid (and/or a salt thereof, e.g., monosodium salt) and D-pyroglutamic acid (and/or a salt thereof, e.g., monosodium salt) is about 75:25 to about 100:0. In some embodiments, the ratio of L-pyroglutamic acid (and/or a salt thereof, e.g., monosodium salt) and D-pyroglutamic acid (and/or a salt thereof, e.g., monosodium salt) is about 37.5:12.5.

In certain embodiments, up to about 300 ppm pyroglutamic acid or a salt form thereof is added to a beverage product, wherein the beverage product is a ready-to-drink liquid formulation. Thus, a ready-to-drink liquid formulation or ready-to-drink beverage as described herein can include pyroglutamic acid (e.g., in any form as described herein) in an amount of up to about 300 ppm by weight of the total beverage product composition (e.g., about 5 ppm, about 25 ppm, about 50 ppm, about 75 ppm, about 100 ppm, about 125 ppm, about 150 ppm, about 175 ppm, about 200 ppm, about 225 ppm, about 250 ppm, about 275 ppm, about 300 ppm, or any ranges between these recited concentrations). As discussed herein, the optimal concentration of pyroglutamic acid may vary according to different types of beverages and the desired effects. In one embodiment, between about 0.1 to about 200 ppm pyroglutamic acid or a salt form thereof is added to a ready-to-drink liquid formulation. In one embodiment, between about 15 ppm to about 150 ppm pyroglutamic acid or a salt form thereof is added to the ready-to-drink liquid formulation. In one embodiment, between about 50 to about 125 ppm pyroglutamic acid or a salt form thereof is added to the ready-to-drink liquid formulation. In one embodiment, between about 5 to about 50 ppm pyroglutamic acid or a salt form thereof is added to the ready-to-drink liquid formulation.

In certain embodiments, the beverage product is a low calorie, ready-to-drink liquid formulation or beverage. Certain ready-to-drink, carbonated low calorie liquid formulations comprise between about 25 ppm to about 125 ppm added pyroglutamic acid or a salt form thereof. Certain ready-to-drink, non-carbonated liquid formulations comprise between about 15 ppm to about 150 ppm added pyroglutamic acid or a salt form thereof. In some embodiments, such non-carbonated liquid formulations are low calorie ready-to-drink beverages.

In certain embodiments, the beverage product is a ready-to-drink beverage comprising dairy and between about 10 to about 200 ppm added pyroglutamic acid.

In certain embodiments, the beverage product is a ready-to-drink liquid formulation or beverage comprising milk and caffeine. Certain ready-to drink beverages comprising milk and caffeine comprise between about 10 ppm to about 75 ppm added pyroglutamic acid or a salt form thereof. Other ready-to drink beverage embodiments comprising milk and caffeine comprise between about 25 ppm to about 50 ppm added pyroglutamic acid or a salt form thereof.

In certain embodiments, the beverage product is a ready-to-drink liquid formulation or beverage of milk. Certain ready-to-drink milk beverage embodiments comprise between about 10 ppm to about 200 ppm added pyroglutamic acid or a salt form thereof. Other ready-to-drink milk beverage embodiments comprise between about 10 ppm to about 100 ppm added pyroglutamic acid or a salt form thereof. Yet further ready-to-drink milk beverage embodiments comprise between about 50 ppm to about 125 ppm added pyroglutamic acid or a salt form thereof. Such ready-to-drink milk beverages may lack caffeine in some embodiments. Such ready-to-drink milk beverages may consist of milk in some embodiments.

In certain embodiments, the beverage product is a zero calorie ready-to-drink liquid formulation or beverage. Certain zero calorie ready-to-drink beverages may comprises between about 5 ppm to about 50 ppm added pyroglutamic acid or a salt form thereof. In some zero calorie ready-to-drink beverage embodiments wherein the beverage is a cola, the amount of added pyroglutamic acid (or salt form thereof) may range from about 5 ppm to about 30 ppm. In some zero calorie ready-to-drink beverage embodiments wherein the beverage is a cola, the amount of added pyroglutamic acid (or salt form thereof) may range from about 5 ppm to about 25 ppm. In certain zero calorie ready-to-drink beverage embodiments wherein the beverage is a flavored water, the amount of added pyroglutamic acid (or salt form thereof) may range from about 20 ppm to about 50 ppm. In certain zero calorie ready-to-drink beverage embodiments wherein the beverage is a tea, the amount of added pyroglutamic acid (or salt form thereof) may range from about 5 ppm to about 20 ppm.

In certain embodiments, the added pyroglutamic acid consists of L-pyroglutamic acid or a salt form thereof. In one embodiment, the added pyroglutamic acid is between about 5 to about 200 ppm L-pyroglutamic acid to a ready-to-drink liquid formulation. In one embodiment, the added pyroglutamic acid is up to or about 50 ppm L-pyroglutamic acid to a ready-to-drink liquid formulation.

In some embodiments, the added pyroglutamic acid consists of D-pyroglutamic acid or a salt form thereof. In some ready-to-drink beverage embodiments, the added pyroglutamic acid consists of D-pyroglutamic acid in an amount of up to or about 50 ppm by weight of the total beverage product composition. In some beverage concentrate embodiments, the added pyroglutamic acid consists of D-pyroglutamic acid in an amount of up to or about 500 ppm by weight of the total beverage product composition. In some beverage concentrate embodiments, the added pyroglutamic acid consists of D-pyroglutamic acid in an amount of up to or about 350 ppm by weight of the total beverage product composition. In some beverage concentrate embodiments, the added pyroglutamic acid consists of D-pyroglutamic acid in an amount of up to or about 250 ppm by weight of the total beverage product composition. In some beverage concentrate embodiments, the added pyroglutamic acid consists of D-pyroglutamic acid in an amount of up to or about 150 ppm by weight of the total beverage product composition.

In some embodiments, the added pyroglutamic acid comprises L-pyroglutamic acid and D-pyroglutamic acid. In certain embodiments, the added pyroglutamic acid consists of L-pyroglutamic acid and D-pyroglutamic acid. In certain embodiments, the added pyroglutamic acid consists of L-pyroglutamic acid and D-pyroglutamic acid in a ratio ranging from about 50:50 to about 100:0. In certain embodiments, the added pyroglutamic acid consists of L-pyroglutamic acid and D-pyroglutamic acid in a ratio ranging from about 75:25 to about 100:0. In some embodiments, the added pyroglutamic acid comprises L-pyroglutamic acid and D-pyroglutamic acid in a ratio of about 37.5:12.5. In one embodiment, the added pyroglutamic acid comprises L-pyroglutamic acid and D-pyroglutamic acid in a ratio of about 25 ppm: 25ppm.

Ready-to-drink beverages comprising carbonation may contain between about 5 to about 200 ppm added L-pyroglutamic acid in some embodiments. In some ready-to-drink carbonated beverages, embodiments may comprise between about 25 ppm to about 125 ppm L-pyroglutamic acid.

In certain low calorie carbonated beverage embodiments, between about 5 ppm to about 75 ppm L-pyroglutamic acid is added. In various low-calorie embodiments wherein the ready-to-drink beverage comprises carbonation, between about 20 ppm to about 75 ppm L-pyroglutamic acid is added. In other low calorie embodiments wherein the ready-to-drink beverage comprises carbonation, between about 20 to about 40 ppm L-pyroglutamic acid is added. In yet other low calorie embodiments wherein the ready-to-drink beverage comprises carbonation, between about 50 to about 75 ppm L-pyroglutamic acid is added. Other suitable low calorie carbonated beverage examples are provided below.

In various ready-to-drink non-carbonated beverage embodiments, between about 10 ppm to about 200 ppm L-pyroglutamic acid is added. Certain ready-to-drink non-carbonated beverage embodiments comprise between about 15 to about 150 ppm L-pyroglutamic acid. Fruit juice such as orange juice, for example, may comprise between about 25 to about 150 ppm L-pyroglutamic acid. In one embodiment, a ready-to-drink non-carbonated beverage comprises between about 15 to about 50 ppm added L-pyroglutamic acid. Other suitable non-carbonated beverage examples are provided below.

In some ready-to-drink dairy beverages, between about 10 ppm to about 200 ppm L-pyroglutamic acid may be added in some embodiments. Certain ready-to-drink non-carbonated beverage embodiments comprising coffee and milk may comprise between about 10 ppm to about 75 ppm L-pyroglutamic acid. In another embodiment, between about 25 ppm to about 50 ppm L-pyroglutamic acid is added to a ready-to-drink non-carbonated coffee beverage comprising dairy. In some ready-to-drink dairy beverages such as milk, between about 50 ppm to 125 ppm L-pyroglutamic acid may be added. Other suitable milk or dairy beverage examples are provided below.

Some embodiments are directed to low calorie beverages comprising pyroglutamic acid. Suitable low calorie beverages include carbonated beverages such as lemon lime, cola beverage (e.g., stevia cola beverage) and non-carbonated beverages such as tea and fruit juice (e.g., stevia orange juice). Other suitable low calorie beverages include any of those known in the art. In some embodiments, the low calorie beverage is a carbonated beverage. In some embodiments, the low calorie beverage is a non-carbonated beverage. In some embodiments, the low calorie beverage is a tea or a fruit juice. In some embodiments, the low calorie beverage is a cola beverage.

In some embodiments, the low calorie beverage comprises one or more sweetener. Suitable amount of sweeteners (e.g., rebaudioside A, rebaudioside D, rebaudioside M) are described herein and can be adjusted based on the desired level of sweetness of the beverage. In some embodiments, the low calorie beverage comprises a nutritive sweetener. In some embodiments, the low calorie beverage comprises a non-nutritive sweetener. In some embodiments, the low calorie beverage comprises a nutritive sweetener and a non-nutritive sweetener. Suitable nutritive sweeteners and non-nutritive sweeteners are described herein. In some embodiments, the nutritive sweetener is sucrose, glucose, fructose, or any combination thereof. In some embodiments, the nutritive sweetener is high fructose corn syrup (HFCS), honey granules, or sugar. In some embodiments, the non-nutritive sweetener is a natural non-nutritive sweetener selected from the group consisting of rebaudioside A, rebaudioside B, rebaudioside C, rebaudioside D, rebaudioside M, iso-steviol glycosides, mogrosides, trilobatin, and combinations thereof. In some embodiments, the non-nutritive sweetener is rebaudioside A (Reb A), rebaudioside D (Reb D), rebaudioside M (Reb M), or any combination thereof (e.g., a mixture of Reb A and Reb D, a mixture of Reb D and Reb M, or a mixture of Reb A, Reb D, and Reb M). In some embodiments, the non-nutritive sweetener is stevia leaf blend. In some embodiments, the low calorie beverage comprises an artificial sweetener such as aspartame, sucralose, acesulfame potassium (ASK), or any combination thereof.

In some embodiments, the low calorie beverage can further include a supplemental sweetness enhancer in an amount sufficient to further enhance the sweetness of the sweetener but in an amount below the supplemental sweetness enhancer's sweetness recognition threshold concentration. Suitable supplemental sweetness enhancers are described herein. In some embodiments, the supplemental sweetness enhancer is D-psicose, erythritol, or a combination thereof. Other ingredients suitable for inclusion in the low calorie beverage are described herein.

Some examples of low calorie beverages are listed in the table below. Unless otherwise obvious, the numeric values in Table 1 should be understood as preceded by the word "about".

TABLE 1

Examples of Low Calorie Beverages Comprising PGA

| Beverage Categories | PGA concentration[1] (ppm) | Ratio of L-form to D-form PGA[2] | Examples |
|---|---|---|---|
| Carbonated Beverage | 25-125 | 0:50 ppm;<br>50 ppm:0;<br>25 ppm:25 ppm | 1) Lemon lime soda, 50-125 ppm (e.g., 50-100 ppm) L-PGA;<br>2) Cola beverage, 40 calories/12 fl. oz, HFCS sweetened, 50-75 ppm (e.g., 50 ppm L-PGA)<br>3) Stevia cola beverage, 80 calories/10 fl. oz, sugar and stevia leaf blend as sweetener, 20-40 ppm (e.g., 25-30 ppm) L-PGA |
| Non-carbonated Beverage | 15-150 | 0:50 ppm;<br>50 ppm:0;<br>25 ppm:25 ppm | 1) Tea (e.g., citrus green tea), sweetened with HFCS, Honey Granules, ASK, Sucralose, 15-50 ppm (e.g., 25-50 ppm) L-PGA |

TABLE 1-continued

Examples of Low Calorie Beverages Comprising PGA

| Beverage Categories | PGA concentration[1] (ppm) | Ratio of L-form to D-form PGA[2] | Examples |
|---|---|---|---|
| | | | 2) Stevia orange juice (e.g., Trop 50 style), 50 calories/8 fl. oz, 25-150 ppm (e.g., 25-50 ppm) L-PGA |

[1]Other suitable PGA concentrations are described herein.
[2]Other suitable ratios are described herein.

Some embodiments of this disclosure are directed to dairy-containing beverages comprising pyroglutamic acid. Non-limiting examples of suitable dairy-containing beverages include milk (e.g., 2% milk) and other beverages containing milk (e.g., coffee drinks containing milk). Other suitable dairy-containing beverages include any of those known in the art.

In some embodiments, the dairy-containing beverage comprises one or more sweetener. Suitable amount of sweeteners (e.g., Reb A, Reb D, and Reb M) are described herein and can be adjusted based on the desired level of sweetness of the beverage. In some embodiments, the dairy-containing beverage comprises a nutritive sweetener. In some embodiments, the dairy-containing beverage comprises a non-nutritive sweetener. In some embodiments, the dairy-containing beverage comprises a nutritive sweetener and a non-nutritive sweetener. Suitable nutritive sweeteners and non-nutritive sweeteners are described herein. In some embodiments, the nutritive sweetener is sucrose, glucose, fructose, or any combination thereof. In some embodiments, the nutritive sweetener is high fructose corn syrup (HFCS), honey granules, or sugar. In some embodiments, the non-nutritive sweetener is a natural non-nutritive sweetener selected from the group consisting of rebaudioside A, rebaudioside B, rebaudioside C, rebaudioside D, rebaudioside M, iso-steviol glycosides, mogrosides, trilobatin, and combinations thereof. In some embodiments, the non-nutritive sweetener is Reb A, Reb D, Reb M, or any combination thereof (e.g., a mixture of Reb A and Reb D, a mixture of Reb D and Reb M, or a mixture of Reb A, Reb D, and Reb M). In some embodiments, the non-nutritive sweetener is stevia leaf blend. In some embodiments, the dairy-containing beverage comprises an artificial sweetener such as aspartame, sucralose, acesulfame potassium (ASK), or any combination thereof.

In some embodiments, the dairy-containing beverage can further include a supplemental sweetness enhancer in an amount sufficient to further enhance the sweetness of the sweetener but in an amount below the supplemental sweetness enhancer's sweetness recognition threshold concentration. Suitable supplemental sweetness enhancers are described herein. In some embodiments, the supplemental sweetness enhancer is D-psicose, erythritol, or a combination thereof. Other ingredients suitable for inclusion in the dairy-containing beverage are described herein.

Some examples of dairy-containing beverages are listed in Table 2 below. Unless otherwise obvious, the numeric values in Table 2 should be understood as preceded by the word "about".

TABLE 2

Examples of Dairy-Containing Beverages Comprising PGA

| Beverage Categories | PGA concentration[1] (ppm) | Ratio of L-form to D-form PGA[2] | Examples |
|---|---|---|---|
| Milk | 10-200 | 50 ppm:0; 37.5 ppm: 12.5 ppm | 2% milk, 100-200 ppm or 50-125 L-PGA |
| Beverages containing milk | 10-75 | 50 ppm:0; 37.5 ppm: 12.5 ppm | Coffee with 2% milk, sweetened with sugar, sucralose, and ASK, 50 calories/11 fl. oz, sugar content 3 g/11 fl. oz, 10-75 ppm (e.g., 25-50 ppm) L-PGA |

[1]Other suitable PGA concentrations are described herein.
[2]Other suitable ratios are described herein.

Some embodiments of this disclosure are directed to zero calorie beverages comprising pyroglutamic acid. Non-limiting examples of suitable zero calorie beverages include cola beverages, flavored water (e.g., carbonated), and tea (e.g., unsweetened). Other suitable zero calorie beverages include any of those known in the art. In some embodiments, the zero calorie beverage is a carbonated beverage. In some embodiments, the zero calorie beverage is a non-carbonated beverage. In some embodiments, the zero calorie beverage is a tea. In some embodiments, the zero calorie beverage is a flavored water. In some embodiments, the zero calorie beverage is a cola beverage.

In some embodiments, the zero calorie beverage comprises one or more non-nutritive sweetener. Suitable amount of sweeteners (e.g., Reb A, Reb D, and Reb M) are described herein and can be adjusted based on the desired level of sweetness of the beverage. Suitable non-nutritive sweeteners are described herein. In some embodiments, the non-nutritive sweetener is a natural non-nutritive sweetener selected from the group consisting of rebaudioside A, rebaudioside B, rebaudioside C, rebaudioside D, rebaudioside M, iso-steviol glycosides, mogrosides, trilobatin, and combinations thereof. In some embodiments, the non-nutritive sweetener is Reb A, Reb D, Reb M, or any combination thereof (e.g., a mixture of Reb A and Reb D, a mixture of Reb D and Reb M, or a mixture of Reb A, Reb D, and Reb M). In some embodiments, the non-nutritive sweetener is stevia leaf blend. In some embodiments, the zero calorie beverage comprises an artificial sweetener such as aspartame, sucralose, acesulfame potassium (ASK), or any combination thereof.

In some embodiments, the zero calorie beverage can further include a supplemental sweetness enhancer in an amount sufficient to further enhance the sweetness of the sweetener but in an amount below the supplemental sweetness enhancer's sweetness recognition threshold concentration. Suitable supplemental sweetness enhancers are described herein. In some embodiments, the supplemental sweetness enhancer is D-psicose, erythritol, or a combination thereof. Other ingredients suitable for inclusion in the zero calorie beverage are described herein.

Some examples of zero calorie beverages are listed in Table 3 below. Unless otherwise obvious, the numeric values in Table 3 should be understood as preceded by the word "about".

TABLE 3

Examples of Zero Calorie Beverages Comprising PGA

| Beverage Categories | PGA concentration[1] (ppm) | Ratio of L-form to D-form PGA[2] | Examples |
|---|---|---|---|
| Cola | 5-50 | 0:50 ppm; 25 ppm:25 ppm | 1) Cola beverage, sweetened by sucralose and ASK, 5-30 ppm PGA (e.g., 25 ppm L-PGA) 2) Cola beverage, sweetened by aspartame and ASK, 5-25 ppm PGA (e.g., 25 ppm L-PGA) |
| Flavored Water | 5-50 | 0:50 ppm; 25 ppm:25 ppm | Flavored water (carbonated), sweetened by sucralose and Reb A, 20-50 ppm PGA (e.g., 50 ppm L-PGA) |
| Tea | 5-50 | 0:50 ppm; 25 ppm:25 ppm | Unsweetened tea, 5-25 ppm PGA (e.g., 25 ppm L-PGA) |

[1]Other suitable PGA concentrations are described herein.

[2]Other suitable ratios are described herein.

Beverages listed in Tables 1-3 were tested. When added at the listed ranges for these examples during test runs, a ready-to-drink beverage comprising pyroglutamic acid provided for more mouthfeel, and in some low-calorie carbonated beverage cases, reduced bitterness and/or aftertaste. When added to ready-to-drink beverages such as orange juice, the composition comprising pyroglutamic acid enhanced the citrus taste and provided more fullness, smoothness. When added to ready-to-drink beverages such as coffee, the composition comprising pyroglutamic acid enhanced the coffee taste, lifted the body, increased the creaminess, enhanced the fatty mouthfeel taste, and provided more fullness. Above about 300 ppm, the ready-to-drink beverages comprising pyroglutamic acid imparted some astringency. The test runs were conducted under standard sensory study conditions, with bench expert tasters.

In certain embodiments, the addition of a pyroglutamic acid, or salt form thereof, as described herein may comprise addition of the pyroglutamic acid or salt form of pyroglutamic acid to a flavor or flavor solvent prior to addition to a beverage product. The pyroglutamic acid or salt form of pyroglutamic acid may be in either solid or liquid form in any amount as disclosed herein, depending on the type of beverage product desired (i.e., low cal, zero cal, dairy, concentrate). The pyroglutamic acid may be added with or without stirring or the like, with or without heating, etc.

The method of enhancing flavor for a beverage product generally comprises the step of adding a pyroglutamic acid or salt form thereof, to a beverage product. This step includes, for example, adding the pyroglutamic acid within a sequence of added components or ingredients in the formation of a beverage product, in combination with other components in the formation of a beverage product, and adding the component directly to a beverage product. Amounts may vary in embodiments wherein the beverage product is a beverage concentrate, so long as the final concentration in a ready-to-drink beverage is less than 300 ppm and so long as the added amount of pyroglutamic acid or salt form thereof maintains solubility in the desired beverage product, which may depend on the final formulation of the beverage product.

Beverage Concentrates

Often, beverages are not prepared in large batches. Instead, a syrup (alternatively referred to as a beverage concentrate or concentrate), water, and optionally carbon dioxide are combined at the time of use or at the time of bottling or dispensing a beverage. The syrup is a concentrated solution of many of the soluble ingredients typically included in a given beverage.

Thus, in certain embodiments, the pyroglutamic acid can be included in a beverage concentrate. At least certain exemplary embodiments of the beverage concentrates contemplated can be prepared with an initial volume of water to which pyroglutamic acid and other ingredients (e.g., a sweetener) are added. In certain embodiments, ready-to-drink liquid formulations or ready-to-drink beverages can be formed from the beverage concentrate by adding further volumes of water to the concentrate. In certain embodiments, a ready-to-drink beverage can be prepared from a concentrate by combining approximately 1 part concentrate with about 3 to about 7 parts water. In certain embodiments, a ready-to-drink beverage can be prepared by combining 1 part concentrate with 5 parts water. In certain exemplary embodiments the water added to the concentrate to form ready-to-drink beverages can be carbonated. In certain other embodiments, a ready-to-drink beverage is directly prepared without the formation of a concentrate and subsequent dilution.

In some embodiments, a beverage concentrate comprises added pyroglutamic acid or a salt form thereof in an amount of up to about 3,000 ppm (e.g., about 5 ppm, about 25 ppm, about 50 ppm, about 75 ppm, about 100 ppm, about 125 ppm, about 150 ppm, about 175 ppm, about 200 ppm, about 225 ppm, about 250 ppm, about 275 ppm, about 300 ppm, about 325 ppm, about 350 ppm, about 375 ppm, about 400 ppm, about 425 ppm, about 450 ppm, about 475 ppm, about 500 ppm, about 525ppm, about 550 ppm, about 575 ppm, about 600 ppm, about 625 ppm, about 650 ppm, about 675 ppm, about 700 ppm, about 725 ppm, about 750 ppm, about 775 ppm, about 800 ppm, about 825 ppm, about 850 ppm, about 875 ppm, about 900 ppm, about 925 ppm, about 950 ppm, about 975 ppm, about 1,000 ppm, about 1,200 ppm, about 1,500 ppm, about 1, 750 ppm, about 2,000 ppm, about 2,100 ppm, about 2,250 ppm, about 2, 500 ppm, about 2,750 ppm, about 3,000, or any ranges between these recited concentrations). In some embodiments, the pyroglutamic acid or salt form thereof is in the amount of up to about 2,100 ppm. In some embodiments, the added pyroglutamic acid or salt form thereof is in an amount of up to about 1,500 ppm. In some embodiments, the added pyroglutamic acid or salt form thereof is up to about 1200 ppm. In some embodiments, the added pyroglutamic acid or salt form thereof is up to about 900 ppm.

As understood by those skilled in the art, the beverage concentrate can also include various other ingredients typically included in a beverage concentrate. For example, the beverage concentrate herein can comprise a sweetener, e.g., a nutritive or non-nutritive sweetener.

In some embodiments, the beverage concentrate includes a natural non-nutritive sweetener selected from the group consisting of rebaudioside A, rebaudioside B, rebaudioside C, rebaudioside D, rebaudioside M, iso-steviol glycosides, mogrosides, trilobatin, and combinations thereof. Other suitable non-nutritive sweeteners are described herein.

In certain embodiments, non-nutritive sweeteners can be present at from about 0.1 ppm to about 3600 ppm depending upon the particular non-nutritive sweetener being used and the desired level of sweetness for the final beverage. For example, the non-nutritive sweeteners can exist in the beverage concentrate in an amount such that upon dilution at a 1-plus-5 throw, the final ready-to-drink beverage contains about 20 ppm up to about 600 ppm (e.g., about 100 ppm, about 200 ppm, about 300 ppm, about 400 ppm, about 500 ppm, about 600 ppm, or any ranges between the specified value) of the respective sweetener. In some embodiments, the beverage concentrate includes rebaudioside A or rebaudioside M, for example, in an amount such that upon dilution at a 1-plus-5 throw, the final beverage contains about 20 ppm to about 600 ppm (e.g., about 300 ppm, about 400 ppm, about 500 ppm, about 600 ppm, or any ranges between the specified value) of rebaudioside A or rebaudioside M. In some embodiments, the beverage concentrate includes rebaudioside D, for example, in an amount such that upon dilution at a 1-plus-5 throw, the final beverage contains up to about 600 ppm (e.g., about 100 ppm, about 200 ppm, about 300 ppm, about 400 ppm, about 500 ppm, or any ranges between the specified value) of rebaudioside D. In some embodiments, the beverage concentrate includes both rebaudioside A and rebaudioside D. In some embodiments, the beverage concentrate includes both rebaudioside M and rebaudioside D.

In some embodiments, the beverage concentrate comprises a nutritive sweetener. For example, in some embodiments, the beverage concentrate comprises a nutritive sweetener selected from the group consisting of sucrose, fructose, glucose, and combinations thereof. Other suitable nutritive sweeteners are described herein. In certain embodiments, nutritive sweeteners can be present in the beverage concentrate at from about 6% to about 71% by weight of the beverage concentrate, such as from about 18% to about 62% by weight, or from about 30% to about 45% by weight, depending upon the desired level of sweetness for the final beverage.

In certain embodiments, the beverage concentrate can further comprise a supplemental sweetness enhancer. The supplemental sweetness enhancer can be in an amount sufficient to further enhance the sweetness of the sweetener but in an amount below the supplemental sweetness enhancer's sweetness recognition threshold concentration in the final beverage.

For example, in certain embodiments, the beverage concentrate further comprises a supplemental sweetness enhancer is selected from the group consisting of D-psicose, erythritol, and combinations thereof. In some embodiments, the beverage concentrate can contain up to about 18 weight percent of D-psicose, erythritol, or combination thereof. In other embodiments, D-psicose or erythritol can be present in an amount of from about 3 to about 9 weight percent. Alternatively, D-psicose can be present in an amount ranging from about 3 to about 9 weight percent and erythritol can be present in an amount of from about 3 to about 6 weight percent.

As understood by those skilled in the art, the beverage in accordance with the disclosure herein can also include various other ingredients typically included in such beverage.

For example, in certain embodiments, the beverage comprising pyroglutamic acid as described herein can comprise a sweetener. The sweeteners included in the beverages disclosed herein are edible consumables. The sweetener can be a nutritive or non-nutritive, natural or synthetic sweetener, or a combination of such sweeteners, so long as the sweetener or combination of sweeteners provides a taste that is perceived as sweet by the sense of taste. The perception of flavoring agents and sweetening agents can depend to some extent on the interrelation of elements. Flavor and sweetness can also be perceived separately, i.e., flavor and sweetness perception can be both dependent upon each other and independent of each other. For example, when a large amount of a flavoring agent is used, a small amount of a sweetening agent can be readily perceptible and vice versa. Thus, the oral and olfactory interaction between a flavoring agent and a sweetening agent can involve the interrelationship of elements.

When used to sweeten, the sweetener or combination of sweeteners in the beverage is present in an amount above the sweeteners' sweetness recognition threshold concentration.

In certain embodiments, one or more nutritive sweeteners can be present in the beverage in an amount of from about 1% to about 20% by weight of the beverage, such as from about 3% to about 16% by weight, or from about 5% to about 12% by weight, depending upon the desired level of sweetness in the beverage composition.

In certain embodiments, non-nutritive sweeteners can be present in the beverage composition in an amount ranging from about 1 ppm to about 600 ppm, depending upon the particular non-nutritive sweetener(s) being used and the desired level of sweetness in the beverage composition.

Exemplary natural nutritive sweeteners suitable for use in the beverages herein include crystalline or liquid sucrose, fructose, glucose, dextrose, maltose, trehalose, fructo-oligosaccharides, glucose-fructose syrup from natural sources such as apple, chicory, and honey; high fructose corn syrup, invert sugar, maple syrup, maple sugar, honey, brown sugar molasses, cane molasses, such as first molasses, second molasses, blackstrap molasses, and sugar beet molasses; sorghum syrup, and mixtures thereof.

Other sweeteners suitable for use in the beverages herein include, but are not limited to, sugar alcohols such as erythritol, sorbitol, mannitol, xylitol, lactitol, isomalt, malitol, tagatose, trehalose, galactose, rhamnose, cyclodextrin, ribulose, threose, arabinose, xylose, lyxose, allose, altrose, mannose, idose, lactose, maltose, isotrehalose, neotrehalose, palatinose or isomaltulose, erythrose, deoxyribose, gulose, talose, erythrulose, xylulose, psicose, turanose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, ketotriose (dehydroxyacetone), aldotriose (glyceraldehyde), nigero-oligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, and mixtures thereof.

Other sweeteners suitable for use in the beverages herein include rare sugars such as D-allose, D-psicose (also known as D-allulose), L-ribose, D-tagatose, L-glucose, L-fucose, L-arabinose, D-turanose, D-leucrose, and mixtures thereof.

Exemplary artificial sweeteners suitable for use in the beverages herein include, but are not limited to, saccharin, cyclamate, aspartame, neotame, advantame, acesulfame potassium, sucralose, mixtures thereof.

Exemplary natural non-nutritive potent sweeteners suitable for use in the beverages herein include steviol glycosides (e.g., stevioside, steviolbioside, rebaudioside A, rebaudioside B, rebaudioside C, rebaudioside D, rebaudioside E, rebaudioside F, rebaudioside H, rebaudioside I, rebaudioside N, rebaudioside K, rebaudioside J, rebaudioside O, rebaudioside M, dulcoside A, rubusoside, iso-steviol glycosides such as iso-rebaudioside A, and mixtures thereof), Lo Han Guo powder, neohesperidin dihydrochalcone, trilobatin, glycyrrhizin, phyllodulcin, hernandulcin, osladin, polypodoside A, baiyunoside, pterocaryoside, thaumatin, monellin, monatin, mabinlins I and II, and mixtures thereof.

In other embodiments, sweeteners derived from fruit, such as Lo Han Guo (LHG) juice concentrate, can be used as a nutritive sweetener in the beverages herein. Other natural non-nutritive potent sweeteners, as described above or any mixture of any of those, can also be included in the beverages. LHG may be obtained from fruit of the plant family Cucurbitaceae, tribe Jollifieae, subtribe Thladianthinae, genus *Siraitia*. LHG often is obtained from the genus/species *S. grosvenorii, S. siamensis, S. silomaradjae, S. sikkimensis, S. africana, S. borneensis,* and *S. taiwaniana.* Suitable fruit includes that of the genus/species *S. grosvenorii,* which is often called Luo Han fruit. LHG contains triterpene glycosides or mogrosides, which constituents may be used as LHG sweeteners. LHG may be used as the juice or juice concentrate, powder, etc. LHG juice concentrate may contain about 3 wt. % to about 12 wt. %, e.g., about 6 wt. % mogrosides, such as mogroside V, mogroside IV, (11-oxo-mogroside V), siamenoside and mixtures thereof. LHG may be produced, for example, as discussed in U.S. Pat. No. 5,411,755. Sweeteners from other fruits, vegetables or plants also may be used as natural or processed sweeteners or sweetness enhancers in at least certain exemplary embodiments of the beverage products disclosed here.

In certain embodiments, combinations of one or more natural nutritive sweeteners, one or more artificial sweeteners, and/or one or more natural non-nutritive potent sweeteners can be used. The foregoing notwithstanding, it should also be recognized that any of the identified sweeteners can, either in addition or instead of, act as supplemental sweetness enhancers, masking agents, or the like, when used in amounts below its (or their) sweetness perception threshold.

In certain embodiments, the beverage comprising pyroglutamic acid as described herein further comprises a sweetener and a supplemental sweetness enhancer.

In certain embodiments, the supplemental sweetness enhancer can be present at a concentration below its sweetness recognition threshold concentration. For example, and in certain embodiments, the beverage can contain up to about 2 weight percent each of D-psicose, erythritol, or combination thereof. In some embodiments, D-psicose and/or erythritol can be present in an amount ranging from about 0.5 to about 2.0 weight percent. Alternatively, D-psicose can be present in an amount ranging from about 0.5 to about 2.0 weight percent and erythritol can be present in an amount ranging from about 0.5 to about 1 weight percent.

Suitable supplemental sweetness enhancers include any of those known in the art. Exemplary supplemental sweetness enhancers include, but are not limited to, D-psicose, erythritol, iso-rebaudioside A, rebaudioside B, rebaudioside C, rubusoside, trilobatin, phyllodulcin, brazzein, and/or mogrosides.

In some embodiments, the supplemental sweetness enhancer is a rare sugar supplemental sweetness enhancer. Exemplary rare sugars include D-psicose (also referred to as D-allulose), D-allose, L-ribose, D-tagatose, L-glucose, L-fucose, L-arabinose, D-turanose, D-leucrose, and mixtures thereof.

In some embodiments, the supplemental sweetness enhancer is a non-nutritive natural enhancer. Suitable non-nutritive natural enhancers include steviol glycosides. Suitable steviol glycosides, include, but are not limited to, stevioside, rebaudioside A, rebaudioside B, rebaudioside C, rebaudioside D, rebaudioside E, rebaudioside F, rebaudioside H, rebaudioside I, rebaudioside N, rebaudioside K, rebaudioside J, rebaudioside O, rebaudioside M, rubusoside, dulcoside A, iso-steviol glycosides such as iso-rebaudioside A, and mixtures thereof. In a particular embodiment, the supplemental sweetness enhancer can be rubusoside, rebaudioside C or rebaudioside B. In other embodiments, the non-nutritive natural enhancer supplemental sweetness enhancer can be a mogrol glycoside. Suitable mogrol glycosides, include, but are not limited to, mogroside V, isomogroside, mogroside IV, siamenoside, and mixtures thereof.

In some embodiments, the supplemental sweetness enhancer is a sugar alcohol supplemental sweetness enhancer. Suitable sugar alcohols include erythritol, sorbitol, mannitol, xylitol, lactitol, isomalt, malitol, and mixture thereof.

In some embodiments, the supplemental sweetness enhancer is a FEMA GRAS supplemental sweetness enhancers. Suitable FEMA GRAS enhancers include, but are not limited to, FEMA GRAS enhancer 4802, FEMA GRAS enhancer 4469, FEMA GRAS flavor 4701, FEMA GRAS enhancer 4720 (rebaudioside C), FEMA GRAS flavor 4774, FEMA GRAS enhancer 4708, FEMA GRAS enhancer 4728, FEMA GRAS enhancer 4601 (rebaudioside A) and combinations thereof.

In some embodiments, the supplemental sweetness enhancer is a salt based (e.g., NaCl) or benzoic acid based sweetness enhancer. Other suitable supplemental sweetness enhancers are known in the art, including, for example, those described in U.S. Patent Application Publication Nos. 2014/0271996, US 2014/0093630, 2014/0094453, and 2014/0272068, along with U.S. Pat. No. 8,877,922

In certain embodiments, the beverage disclosed herein can further comprise other ingredients such as antioxidants, food grade acids, food grade bases, flavorants, colors, preservatives, carbon dioxide, buffering salts, and the like. Carbonation in the form of carbon dioxide can be added for effervescence. In certain embodiments, preservatives can be added if desired or necessary, depending upon factors including the presence of other ingredients, production technique, desired shelf life, etc.

By way of example, a flavor, flavoring, or flavorant may include solid or liquid flavorants, and the like, used to deliver flavor, taste, seasoning or aroma to a beverage product, including without limitation a flavor masking agent, a sweetener modifier, a bitter modifier, a mouthfeel modifier, a texture modifier and the like. Exemplary flavorings include, but are not limited to, cola flavoring, citrus flavoring, spice flavorings, and combinations thereof.

In certain embodiments, the beverage product also comprises caffeine. Certain exemplary embodiments of the beverages disclosed herein are cola-flavored carbonated beverages, characteristically containing, in addition to the ingredients included in the beverage compositions disclosed herein, carbonated water, sweetener, kola nut extract and/or other flavorings, caramel coloring, phosphoric acid, and optionally other ingredients. Additional and alternative suitable ingredients will be recognized by those skilled in the art given the benefit of this disclosure.

It should be understood that beverages and beverage concentrates in accordance with this disclosure can have any of numerous different specific formulations or constitutions. The formulation of a beverage product in accordance with this disclosure can vary, depending upon such factors as the product's intended market segment, its desired nutritional characteristics, flavor profile, and the like. For example, further ingredients can be added to the formulation of a particular beverage embodiment. Further ingredients include, but are not limited to, one or more additional sweeteners in addition to any sweetener already present, flavorings, electrolytes, vitamins, fruit juices or other fruit products, tastants, masking agents, flavor enhancers, carbonation, or any combination of the foregoing. These can be added to any of the beverage compositions to vary the taste, mouthfeel, and/or nutritional characteristics of the beverage composition.

Additional Ingredients

In certain embodiments, the beverage or beverage concentrate disclosed herein can contain a flavor composition, for example, natural, nature identical, and/or synthetic fruit flavors, botanical flavors, other flavors, and mixtures thereof. As used herein, the term "fruit flavor" refers generally to those flavors derived from the edible reproductive part of a seed plant including those plants wherein a sweet pulp is associated with the seed, e.g., tomato, cranberry, and the like, and those having a small, fleshy berry. The term berry includes true berries as well as aggregate fruits, i.e., not "true" berries, but fruit commonly accepted as such. Also included within the term "fruit flavor" are synthetically prepared flavors made to simulate fruit flavors derived from natural sources. Examples of suitable fruit or berry sources include whole berries or portions thereof, berry juice, berry juice concentrates, berry purees and blends thereof, dried berry powders, dried berry juice powders, and the like.

Exemplary fruit flavors include the citrus flavors, e.g., orange, lemon, lime grapefruit, tangerine, mandarin orange, tangelo, and pomelo, apple, grape, cherry, and pineapple flavors. In certain embodiments concentrates and beverages comprise a fruit flavor component, e.g., a juice concentrate or juice. As used here, the term "botanical flavor" refers to flavors derived from parts of a plant other than the fruit. As such, botanical flavors can include those flavors derived from essential oils and extracts of nuts, bark, roots, and leaves. Also included within the term "botanical flavor" are synthetically prepared flavors made to simulate botanical flavors derived from natural sources. Examples of such flavors include cola flavors, tea flavors, and mixtures thereof. The flavor component may further comprise a blend of several of the above-mentioned flavors. In certain exemplary embodiments of the beverage concentrates and beverages a cola flavor component is used or a tea flavor component. The particular amount of the flavor component useful for imparting flavor characteristics to the beverages of the present disclosure will depend upon the flavor(s) selected, the flavor impression desired, and the form of the flavor component. Those skilled in the art, given the benefit of this disclosure, will be readily able to determine the amount of any particular flavor component(s) used to achieve the desired flavor impression.

Juices suitable for use in certain exemplary embodiments of the beverages or beverage concentrates disclosed herein include, e.g., fruit, vegetable and berry juices. Juices may be employed in the present beverages in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavorings, to generate a concentrate or beverage having a desired flavor. Examples of suitable juice sources include plum, prune, date, currant, fig, grape, raisin, cranberry, pineapple, peach, banana, apple, pear, guava, apricot, Saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, mandarin, melon, watermelon, and grapefruit. Numerous additional and alternative juices suitable for use in at least certain exemplary embodiments will be apparent to those skilled in the art given the benefit of this disclosure. In the compositions of the present disclosure employing juice, juice can be used, for example, at a level of at least about 0.2 weight percent of the composition. In certain embodiments juice can be employed at a level of from about 0.2 weight percent to about 40 weight percent. In further embodiments, juice can be used, if at all, in an amounts ranging from about 1 weight percent to about 20 weight percent.

Juices that are lighter in color can be included in the formulation of certain exemplary embodiments to adjust the flavor and/or increase the juice content of the beverage without darkening the beverage color. Examples of such juices include apple, pear, pineapple, peach, lemon, lime, orange, apricot, grapefruit, tangerine, rhubarb, cassis, quince, passion fruit, papaya, mango, guava, litchi, kiwi, mandarin, coconut, and banana. Deflavored and decolored juices can be employed if desired.

Other flavorings suitable for use in at least certain exemplary embodiments of the beverages or beverage concentrates disclosed here include, e.g., spice flavorings, such as cassia, clove, cinnamon, pepper, ginger, vanilla spice flavorings, cardamom, coriander, root beer, sassafras, ginseng, and others. Numerous additional and alternative flavorings suitable for use in at least certain exemplary embodiments will be apparent to those skilled in the art given the benefit of this disclosure. Flavorings may be in the form of an extract, oleoresin, juice concentrate, bottler's base, or other forms known in the art. In at least certain exemplary embodiments, such spice or other flavors complement that of a juice or juice combination.

The one or more flavorings may be used in the form of an emulsion. A flavoring emulsion can be prepared by mixing some or all of the flavorings together, optionally together with other ingredients of the beverage, and an emulsifying agent. The emulsifying agent can be added with or after the flavorings mixed together. In certain exemplary embodiments the emulsifying agent is water-soluble. Exemplary suitable emulsifying agents include gum acacia, modified starch, carboxymethylcellulose, gum tragacanth, gum ghatti and other suitable gums. Additional suitable emulsifying agents will be apparent to those skilled in the art of beverage formulations, given the benefit of this disclosure. The emulsifier in exemplary embodiments comprises greater than about 3% of the mixture of flavorings and emulsifier. In certain exemplary embodiments the emulsifier is from about 5% to about 30% of the mixture.

As noted above, carbon dioxide can be used to provide effervescence to certain exemplary embodiments of the beverages disclosed here. Any of the techniques and carbonating equipment known in the art for carbonating beverages can be employed. Carbon dioxide can enhance beverage taste and appearance and may aid in safeguarding the beverage purity by inhibiting and/or destroying objectionable bacteria. In certain embodiments, for example, the beverage can have a $CO_2$ level up to about 4.0 volumes carbon dioxide. Other embodiments can have, for example, from about 0.5 volume to about 5.0 volumes of carbon dioxide. As used herein, one volume of carbon dioxide refers to the amount of carbon dioxide absorbed by a given quantity of a given liquid, such as water, at 60° F. (16° C.) and one atmospheric pressure. A volume of gas occupies the same space as does the liquid by which it is dissolved. The carbon dioxide content can be selected by those skilled in the art based on the desired level of effervescence and the impact of the carbon dioxide on the taste or mouthfeel of the beverage.

In certain embodiments, caffeine can be added to any of the disclosed beverages or syrups described herein. The amount of caffeine added can be determined by the desired properties of a given beverage or syrup, and any applicable regulatory provisions of the country where the beverage or syrup is marketed. In certain embodiments caffeine can be included in an amount sufficient to provide a final beverage product having less than about 0.02 weight percent caffeine. The caffeine must be of purity acceptable for use in beverages. The caffeine may be natural or synthetic in origin.

The beverage products disclosed here can contain additional ingredients, including, generally, any of those typically found in beverage formulations. Examples of such additional ingredients include, but are not limited to, caramel and other coloring agents or dyes, foaming or antifoaming agents, gums, emulsifiers, tea solids, cloud components, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (ascorbic acid), B (thiamine), B2 (riboflavin), B6, B12, K, niacin, folic acid, biotin, and combinations thereof. The optional non-mineral nutritional supplements are typically present in amounts generally accepted under good manufacturing practices. Exemplary amounts can be between about 1% and about 100% Recommended Daily Value (RDV), where such RDVs are established. In certain exemplary embodiments the non-mineral nutritional supplement ingredient(s) can be present in an amount of from about 5% to about 20% RDV, where established.

Preservatives may be used in at least certain embodiments of the beverages or beverage concentrates disclosed here. That is, at least certain exemplary embodiments can contain an optional dissolved preservative system. Solutions with a pH below 4 and especially those below 3 typically are "micro-stable," i.e., they resist growth of microorganisms, and so are suitable for longer term storage prior to consumption without the need for further preservatives. However, an additional preservative system can be used if desired. If a preservative system is used, it can be added to the product at any suitable time during production, e.g., in some cases prior to the addition of sweeteners. As used here, the terms "preservation system" or "preservatives" include all suitable preservatives approved for use in beverage compositions, including, without limitation, such known chemical preservatives as benzoates, e.g., sodium, calcium, and potassium benzoate, sorbates, e.g., sodium, calcium, and potassium sorbate, citrates, e.g., sodium citrate and potassium citrate, polyphosphates, e.g., sodium hexametaphosphate (SHMP), and mixtures thereof, and antioxidants such as ascorbic acid, EDTA, BHA, BHT, TBHQ, dehydroacetic acid, dimethyldicarbonate, ethoxyquin, heptylparaben, and combinations thereof. Preservatives may be used in amounts not exceeding mandated maximum levels under applicable laws and regulations.

The level of preservative used can be adjusted according to the planned final product pH and/or the microbiological spoilage potential of the particular beverage formulation. The maximum level employed typically is about 0.05 weight percent of the beverage. It will be within the ability of those skilled in the art, given the benefit of this disclosure, to select a suitable preservative or combination of preservatives for beverages according to this disclosure.

Other methods of preservation suitable for at least certain exemplary embodiments of the products disclosed here include, e.g., aseptic packaging and/or heat treatment or thermal processing steps, such as hot filling and tunnel pasteurization. Such steps can be used to reduce yeast, mold and microbial growth in the beverage products. For example, U.S. Pat. No. 4,830,862 discloses the use of pasteurization in the production of fruit juice beverages as well as the use of suitable preservatives in carbonated beverages. U.S. Pat. No. 4,925,686 discloses a heat-pasteurized freezable fruit juice composition which contains sodium benzoate and potassium sorbate. Both of these patents are incorporated by reference in their entireties. In general, heat treatment includes hot fill methods typically using high temperatures for a short time, e.g., about 190° F. for 10 seconds, tunnel pasteurization methods typically using lower temperatures for a longer time, e.g., about 160° F. for 10-15 minutes, and retort methods typically using, e.g., about 250° F. for 3-5 minutes at elevated pressure, i.e., at pressure above 1 atmosphere.

Suitable antioxidants may be selected from the group consisting of rutin, quercetin, flavonones, flavones, dihydroflavonols, flavonols, flavandiols, leucoanthocyanidins, flavonol glycosides, flavonone glycosides, isoflavonoids, and neoflavonoids. In particular, the flavonoids may be, but not limited to, quercetin, eriocitrin, neoeriocitrin, narirutin, naringin, hesperidin, hesperetin, neohesperidin, neoponcirin, poncirin, rutin, isorhoifolin, rhoifolin, diosmin, neodiosmin, sinensetin, nobiletin, tangeritin, catechin, catechin gallate, epigallocatechin, epigallocatechin gallate, oolong tea polymerized polyphenol, anthocyanin, heptamethoxyflavone, daidzin, daidzein, biochaminn A, prunetin, genistin, glycitein, glycitin, genistein, 6,7,4' trihydroxy isoflavone, morin, apigenin, vitexin, balcalein, apiin, cupressuflavone, datiscetin, diosmetin, fisetin, galangin, gossypetin, geraldol, hinokiflavone, primuletin, pratol, luteolin, myricetin, orientin, robinetin, quercetagetin, and hydroxy-4-flavone.

Suitable food grade acids are water soluble organic acids and their salts and include, for example, phosphoric acid, sorbic acid, ascorbic acid, benzoic acid, citric acid, tartaric acid, propionic acid, butyric acid, acetic acid, succinic acid, glutaric acid, maleic acid, malic acid, valeric acid, caproic acid, malonic acid, aconitic acid, potassium sorbate, sodium benzoate, sodium citrate, amino acids, and combinations of any of them. Such acids are suitable for adjusting the pH of the beverage.

Suitable food grade bases are sodium hydroxide, potassium hydroxide, and calcium hydroxide. Such bases also are suitable for adjusting the pH of a beverage.

Beverage Dispensing System Comprising Pyroglutamic Acid

The pyroglutamic acid or a salt thereof as described herein can also be included in a beverage concentrate or otherwise as a beverage ingredient in a post-mix beverage dispensing system for preparing a ready to drink beverage. Suitable post-mix beverage dispensing systems include any of those known in the art, for example, those described in U.S. Pat. Nos. 8,590,753, 8,740,020, 9,260,284, and U.S. Pat. Appl. Publ. Nos. 2011/0166910 and 2016/0023842.

In certain embodiments, the post-mix beverage dispensing system can comprise a container, an attachment mechanism, and a cartridge. In certain embodiments, the container may hold a mixing solution or liquid, such as water, to be mixed with the contents of the cartridge. In certain embodiments, the cartridge can comprise a beverage pod and a cap. The beverage pod is generally a vessel capable of holding a syrup (concentrate), paste, powder, granules, or other composition suitable for mixing with the mixing solution to form a ready-to-drink beverage. Exemplary pods are described, for example, in U.S. Pat. No. 8,590,753.

The attachment mechanism is generally located within the container. The attachment mechanism can comprise an engagement assembly, a piercing portion, and a valve assembly. The engagement assembly generally receives the cartridge within the attachment mechanism. The piercing portion typically pierces the cartridge, thereby releasing the contents of the cartridge into the container. The valve assembly can open upon engagement of the cartridge with the attachment mechanism. The cartridge can engage with the attachment mechanism to open the cartridge to be dispensed into the container, thereby combining the contents of the cartridge with the liquid within the container to create a drinkable beverage.

In some embodiments, the pyroglutamic acid or the salt thereof can be a component in a beverage concentrate included in the beverage cartridge, for example, in the beverage pod described above. In some embodiments, the pyroglutamic acid or the salt thereof is provided in the beverage cartridge in a solid form, for example as a powder or granules. In other embodiments, the pyroglutamic acid or the salt thereof can be provided as a paste in the beverage cartridge.

The pyroglutamic acid or the salt thereof in the beverage cartridge can be in any form of pyroglutamic acid in any suitable amount/concentration as described herein. For example, the pyroglutamic acid or the salt thereof in the beverage cartridge can be in an amount such that the ready to drink beverage created from the beverage cartridge includes the pyroglutamic acid or the salt thereof in an amount of up to about 300 ppm by weight of the total beverage product composition (e.g., about 5 ppm, about 25 ppm, about 50 ppm, about 75 ppm, about 100 ppm, about 125 ppm, about 150 ppm, about 175 ppm, about 200 ppm, about 225 ppm, about 250 ppm, about 275 ppm, about 300 ppm, or any ranges between these recited concentrations). The optimal concentration of pyroglutamic acid may vary according to different types of beverages to be created from the beverage dispensing system and the desired effects. A skilled person can adjust the amounts of pyroglutamic acid in the beverage cartridge for a given beverage to achieve a certain effect based on the disclosure herein. A skilled person can also adjust the types and amounts of other ingredients for creating beverages from the beverage dispensing system to achieve the taste effects described elsewhere herein.

EXAMPLES

The formulations and compositions described herein are now further detailed with reference to the following examples. These examples are provided for the purpose of illustration only and the embodiments described herein should in no way be construed as being limited to these examples. Rather, the embodiments should be construed to encompass any and all variations, which become evident as a result of the teaching provided herein.

Unless otherwise specified below, tastings were performed by a single taster using a “sip, spit, rinse” protocol. Under this protocol, the taster sipped up to about 10 ml of a given solution and assessed the sweetness, mouthfeel, and other characteristics of the solution during its residence in the taster’s mouth; spit out the solution after making the assessment; and rinsed with water to cleanse the palate before testing any further samples.

Example 1

Effect of L-PGA in Low Calorie Beverages

Various carbonated and non-carbonated beverages were tested at the indicated concentrations, with results shown in Table 4.

TABLE 4

Effects of Addition of L-PGA in Specific Low Calorie Beverages

| Product | L-PGA Use Rate tested (ppm) | Resulting Attributes | Sugar |
|---|---|---|---|
| Carbonated Lemon Lime Soft Drink | 50-100 | mouthfeel enhancement | 30% Reduced |
| Cola CSD (40 Cal, HFCS sweetened) | 50 | Adds complexity by adding smoothness and backend sugar-like body | Approx. 3 g/12 oz |
| Stevia Cola (Sugar and Stevia Leaf blend) | 25-30 | More viscous, mouth coating, intense flavor note, some tart notes | 22 g per 10 floz |
| Tea (Citrus green tea, HFCS, Honey granules, ASK, and Sucralose) | 25-50 | Masks bitterness, mouthfeel improvement | NA |
| Stevia Orange Juice | 25-50 | Mouthfeel improvement, less tartness, more viscous and slightly sweeter | 10 g per 8floz |

Based on the above results, in the case of carbonated beverages, L-PGA added in amounts of between about 25-125 ppm adds complex mouthfeel perception by providing viscous feel/body, intense flavor note, smoothness and backend sugar-like body. For unsweetened tea, added amounts of about 15-50 ppm L-PGA reduced bitterness. For orange juice sweetened by Stevia, L-PGA added in amounts of between about 25-150 ppm helps with reducing tartness and making the product slightly sweet.

Example 2

Effect of L-PGA in Dairy Containing Beverages

To coffee comprising 2% milk and sweetened with sugar, sucralose and ASK (3 grams sugar per 11 fl oz), a range of 25-50 ppm L-pyroglutamic acid was added. The resulting dairy containing beverages were evaluated to provide for a clear mouthfeel impact, providing for a fatty sensation and a slightly creamier taste with fullness and body. The addition was said to improve upon the coffee character and provide less aftertaste.

To 2% milk, 100 ppm to about 200 ppm added L-pyroglutamic acid was added. The lower end of the range, in particular, showed a mouthfeel improvement as well as an enhanced milk character.

Based on the above evaluations, an added amount of L-pyroglutamic acid of between about 10-200 ppm is a great mouthfeel ingredient in the dairy beverage category by providing fat enhancement, creamier mouthfeel and improving flavor character.

Example 3

Effect of L-PGA in Zero Calorie Beverages

Various zero calorie beverages were tested using an added amount of 25 ppm L-PGA; specifically, two caffeinated carbonated soft drinks (1-Sucralose & Acesulfame-K Cola and 2-Aspartame & Acesulfame-K Cola) and an unsweetened tea. For the Sucralose & Acesulfame-K Cola, the resulting noted attributes included improved mouthfeel, more viscous, full or dense notes, and a reduced linger. For the Aspartame & Acesulfame-K Cola, a reduced aftertaste was noted. For the Unsweetened Tea, the results noted were less bitter, more palatable, and more body.

Based on the above results, it can be seen that L-pyroglutamic acid reduces the bitterness and aftertaste in the zero calorie category.

Example 4

Effect of Ratio of L-PGA and D-PGA

Following the general experimental procedures above, different ratios of L-PGA and D-PGA were added to coffee, cola (both aspartame and acesulfame-K sweetened and sucralose and acesulfame-K sweetened), and stevia cola as indicated below, together with corresponding effects noted in Table 5.

TABLE 5

Effects of Addition of L- and D-PGA to Specific Caffeinated Beverages

| Ratio L:D (ppm) | Coffee with milk | Zero Calorie Cola (Aspertame & Acesulfame-K) | Zero Calorie Cola (Sucralose & Acesulfame-K) | Low Calorie Cola (Stevia) |
|---|---|---|---|---|
| L:D 50:0 | Increased mouthfeel, creamy notes, heavy body and roast notes | Increase in mouthfeel | Increased mouthfeel, good sweetness | Slightly more syrupy, good sweetness |
| L:D 25:25 | Mouthfeel improvement, reduced bitterness, adds body | Mouthfeel increase, masked bitter backend | Increased mouthfeel | Slightly heavy, slight aftertaste masking |
| L:D 12.5:37.5 | High increase mouthfeel, fullness in mouth | iIcrease in mouthfeel | Sour off-note | Increased sour off-notes |
| L:D 37.5:12.5 | Increased mouthfeel, Masked coffee notes | Increase in mouthfeel, masked bitterness, reduced sweetness | Sour finish | Increased sour off-notes |

Based on the above results, various PGA formulations work well in dairy products (coffee with milk) in providing the reduced coffee bitter notes and helping improve the fullness mouthfeel. L-PGA in an amount of about 50 ppm also generally provided for enhanced beverages in each of the above cases of Table 5.

D-PGA in an amount of about 50 ppm also performed well to enhance the beverage products by reducing bitterness and mask aftertaste, as evident from the tasting on zero calorie beverages. In the case of low calorie beverages such as Stevia Cola, D-PGA helps reduce bitterness and backend lingering/aftertaste, while L-PGA enhances the syrupy note.

Additional components may balance some of the sour off-notes experienced with some of the above beverages comprising D-PGA.

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A coffee beverage product comprising an added amount of L-pyroglutamic acid or a salt thereof, wherein the concentration of added L-pyroglutamic acid or salt thereof ranges from about 5 ppm to less than 100 ppm by weight of the coffee beverage product;

wherein the coffee beverage product is substantially free of added D-pyroglutamic acid; and wherein the coffee beverage product has enhanced mouthfeel relative to a coffee beverage product without added L-pyroglutamic acid.

2. The coffee beverage product of claim 1 wherein the L-pyroglutamic acid or salt thereof is in the form of L-pyroglutamic acid, monosodium L-pyroglutamate, or a mixture thereof.

3. The coffee beverage product of claim 1 further comprising dairy.

4. The coffee beverage product of claim 1 further comprising an added flavor.

5. The coffee beverage product of claim 1 further comprising a sweetener, water, dairy, caffeine, carbonation, fruit juice, vegetable juice, food grade acid, or a mixture thereof.

6. The coffee beverage product of claim 1 wherein the coffee beverage product is a ready-to-drink coffee beverage and wherein the concentration of added L-pyroglutamic acid or salt thereof in the coffee beverage ranges from about 5 ppm to about 75 ppm by weight of the beverage product.

7. The coffee beverage product of claim 6 wherein the concentration of added L-pyroglutamic acid or salt thereof in the coffee beverage ranges from about 5 ppm to about 50 ppm by weight of the beverage product.

8. The coffee beverage product of claim 6 wherein the concentration of added L-pyroglutamic acid or salt thereof in the coffee beverage ranges from about 15 ppm to about 50 ppm by weight of the beverage product.

9. A method of enhancing mouthfeel of a coffee beverage product, the method comprising adding L-pyroglutamic acid or a salt thereof to the coffee beverage product, wherein the concentration of added L-pyroglutamic acid or salt thereof in the coffee beverage product ranges from about 5 ppm to less than 100 ppm by weight of the beverage product; and wherein the coffee beverage product is substantially free of added D-pyroglutamic acid.

10. The method of claim 9 wherein the L-pyroglutamic acid is added to the coffee beverage product in the form of L-pyroglutamic acid, monosodium L-pyroglutamate, or a mixture thereof.

11. The method of claim 9 further comprising adding the L-pyroglutamic acid or salt thereof to a flavor or flavor solvent prior to adding the L-pyroglutamic acid or salt thereof to the coffee beverage product.

12. The method of claim 9 wherein the coffee beverage product is a ready-to-drink coffee beverage and wherein the concentration of L-pyroglutamic acid or salt thereof in the coffee beverage after the L-pyroglutamic acid has been added ranges from about 5 ppm to about 75 ppm by weight of the beverage product.

13. A coffee beverage product comprising an added amount of pyroglutamic acid or a salt thereof, wherein the concentration of added pyroglutamic acid or salt thereof ranges from about 5 ppm to less than 100 ppm by weight of the beverage product;

wherein the added pyroglutamic acid consists of L-pyroglutamic acid and D-pyroglutamic acid in a ratio ranging from about 50:50 to about 100:0; and wherein the coffee beverage product has an enhanced mouthfeel relative to a coffee beverage product without added pyroglutamic acid.

* * * * *